United States Patent
Molyneux

[11] Patent Number: 5,447,808
[45] Date of Patent: Sep. 5, 1995

[54] BATTERY OF HIGH TEMPERATURE SECONDARY CELLS

[75] Inventor: John Molyneux, Runcorn, United Kingdom

[73] Assignee: Chloride Silent Power Limited, London, England

[21] Appl. No.: 140,152

[22] PCT Filed: May 6, 1992

[86] PCT No.: PCT/GB92/00822
§ 371 Date: Nov. 8, 1993
§ 102(e) Date: Nov. 8, 1993

[87] PCT Pub. No.: WO92/21155
PCT Pub. Date: Nov. 26, 1992

[30] Foreign Application Priority Data
May 14, 1991 [GB] United Kingdom ............... 9110403

[51] Int. Cl.6 ............................................. H01M 2/06
[52] U.S. Cl. .................................... 429/158; 429/120; 429/123; 429/152; 429/156; 429/157; 429/159; 429/160; 429/161; 429/178
[58] Field of Search ............... 429/30, 161, 120, 178, 429/123, 152, 156, 157, 158, 159, 160

[56] References Cited
U.S. PATENT DOCUMENTS

| | | |
|---|---|---|
| 4,443,525 | 4/1984 | Hasenauer . |
| 4,546,056 | 10/1985 | Jessen et al. ............... 429/144 |
| 5,034,290 | 7/1991 | Sands et al. ............... 429/120 |
| 5,114,807 | 5/1992 | Rowlette ............... 429/152 |
| 5,302,473 | 4/1994 | Bennett ............... 429/160 |

FOREIGN PATENT DOCUMENTS

| | | |
|---|---|---|
| 0065170 | 11/1982 | European Pat. Off. . |
| 0089852 | 9/1983 | European Pat. Off. . |
| WO89/00344 | 1/1989 | WIPO . |

Primary Examiner—Prince Willis, Jr.
Assistant Examiner—M. Nuzzolillo
Attorney, Agent, or Firm—Finnegan, Henderson, Farabow, Garrrett & Dunner

[57] ABSTRACT

A battery of high temperature cells in a battery casing includes a plurality of rigid metal elements secured to a rigid board of electrical insulating material. The metal elements provide mutually insulated conducting pathways. One end of each of the metal elements connects to either a cell or a bank of cells and an opposite end converges to a location on the board. The board may include one or more of these locations to allow for multiple electrical connections to be made through the casing. In addition, the number of the locations on the board may be less than the number of metal elements.

6 Claims, 3 Drawing Sheets

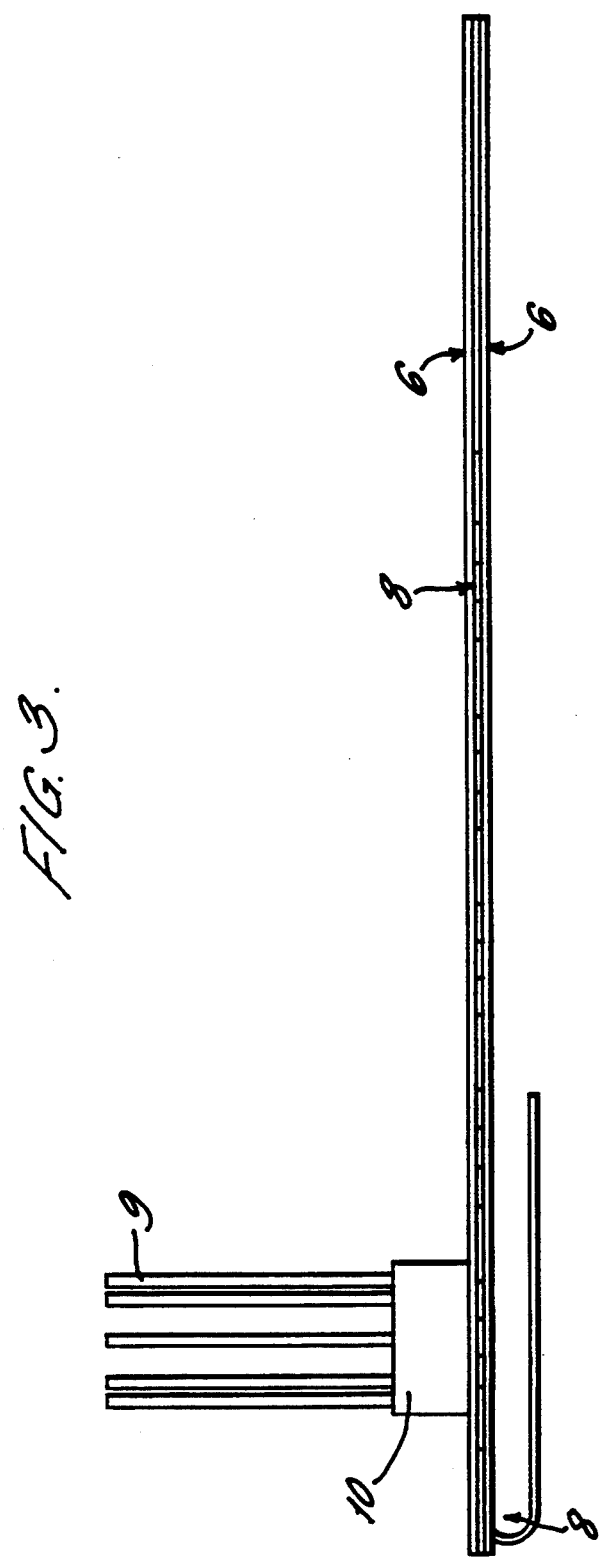

BATTERY OF HIGH TEMPERATURE SECONDARY CELLS

BACKGROUND OF THE INVENTION

This application is a 371 of PCT/GB92/00822 filed on May 6, 1992.

The present invention relates to a battery of high temperature secondary cells in a battery casing having means enabling multiple electrical connections from outside the casing, in particular, a battery of the sodium sulphur type.

The sodium sulphur type battery is a form of secondary battery employing molten sodium and sulphur as the electrode materials. The potential advantages of the sodium sulphur battery over, for example, lead acid batteries are its lightweight, high storage capacity and relatively quick recharging time. Furthermore, sodium and sulphur are both materials which are cheap and abundant. A typical sodium sulphur battery is described in International patent application No. PCT/GB88/00500 (WO 89/00344) which is in the name of the applicant.

In order to provide a battery capable of powering a vehicle, it may be necessary to assemble as many as 3000 individual cells in arrays. The cells are first connected in series to form strings, the strings are then connected in parallel to form banks and the banks themselves are then connected in series. When sodium sulphur cells are fully charged they have a high resistance. Thus, it is necessary to provide separate connections to each of the series connected banks, so that a fully charged bank can be by-passed to ensure that remaining banks can themselves be fully charged. Sodium sulphur batteries must operate at temperatures of about 350° C. and are housed in thermally insulating casings to prevent excessive heat loss. Connections to the various banks of cells within the battery casing must be capable of withstanding such high operating temperatures without degradation of electrical insulation. Further, in order to provide charging current selectively to individual banks of cells within the battery, the connections to the banks must be taken through the thermally insulating battery casing for connection to external charging apparatus. These lead outs through the battery casing should be designed to avoid excessive heat loss through the casing.

Whilst the need for multiple lead-outs from each series connected bank of a battery has been described above for sodium sulphur batteries, similar requirements may arise for other kinds of battery formed of high temperature cells. Generally, for the purpose of this specification, high temperature batteries and high temperature cells are defined as those required to be at above 150° C. in order to operate.

As mentioned earlier, a problem encountered when there are numerous lead outs is that the lead outs not only serve their intended electrical function but also provide a good path for heat to be conducted out of the battery. Steps must, therefore, be taken to minimize heat loss which occurs in this way and in addition, they must be capable of withstanding the flow of high current.

SUMMARY OF THE INVENTION

Accordingly, the present invention provides a battery of high temperature secondary cells in a battery casing having means enabling multiple, electrical connections from outside said casing to respective cells or banks of cells within the casing, comprising a rigid board of electrical insulating material which is stable at the operating temperature of the battery, and rigid metal elements secured to said board to provide respective, mutually insulated, conducting pathways, said elements being connected by one end to respective cells or banks of cells and having opposite ends converging to at least one location on the board for connection through the casing.

Preferably, the rigid board comprises two layers of mica between which are located the rigid metal elements in the form of strips.

Preferably, the mica layers have holes therethrough at the points where the strips converge.

Preferably, the rigid metal elements are connected to pins at the points where they converge, the said pins leading through the battery casing to the external charging apparatus.

Preferably, the pins extend substantially 90° to the plane of the rigid board.

BRIEF DESCRIPTION OF THE DRAWINGS

A preferred embodiment of the present invention will now be described in detail, by way of example only, with reference to the accompanying drawings, of which:

FIG. 3 is an enlarged view of the apparatus in direction A—A in FIG. 2.

DETAILED DESCRIPTION OF THE PREFERRED EMBODIMENT

Figure 1:
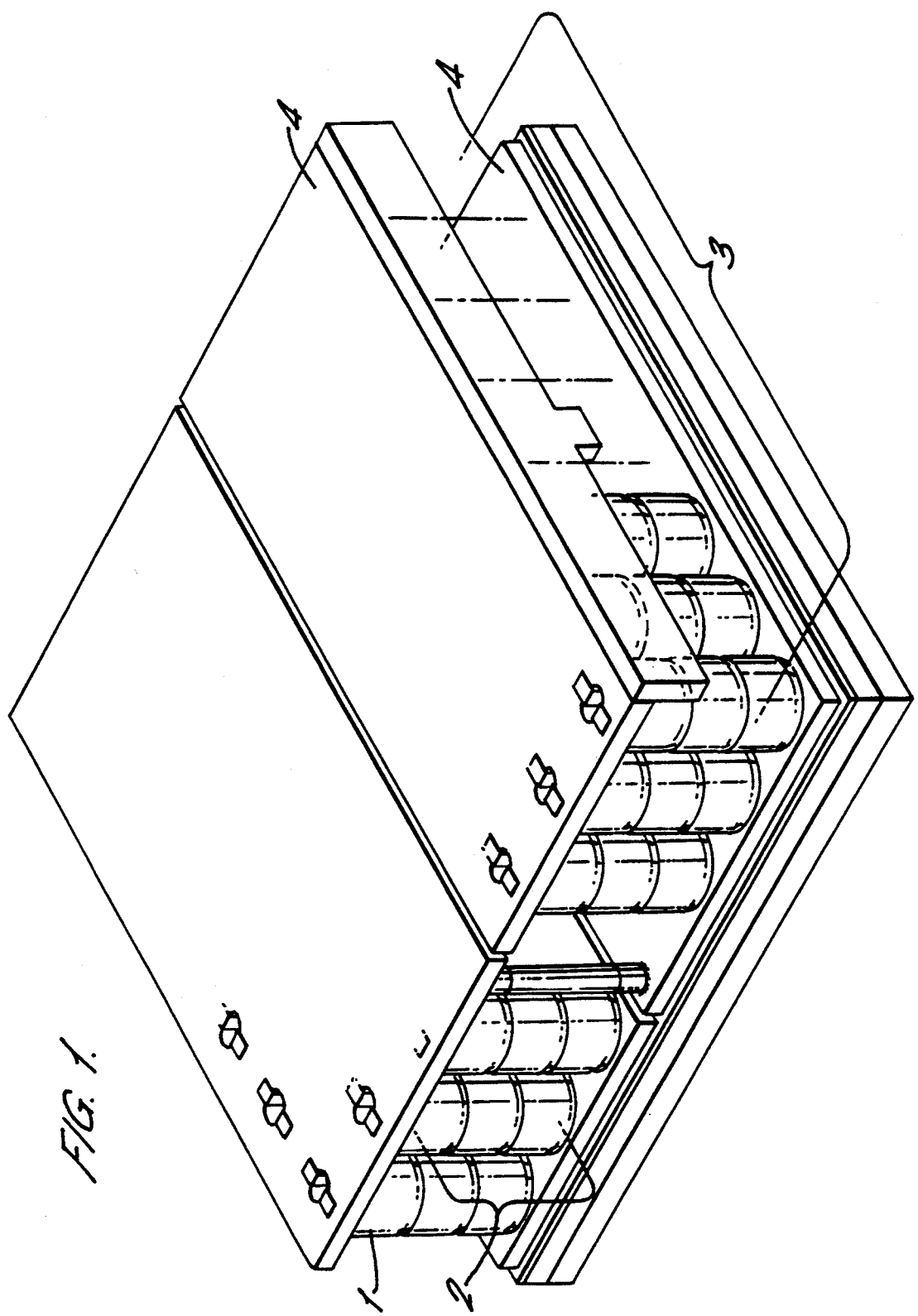
FIG. 1 depicts an arrangement of cells suitable for use with the apparatus of the present invention.

FIG. 1 shows an arrangement of individual sodium sulphur cells 1 connected in series to form strings 2. The strings 2 are then connected in parallel to form banks 3. The banks 3 are then themselves connected in series to form the arrangement. The cells 1 are connected between respective pairs of bus plates 4 and secured in position. The arrangement of cells will then be placed within an insulating battery casing (not shown). There will be connections to each bank 3 of cells which must be taken through the battery casing.

Figure 2:
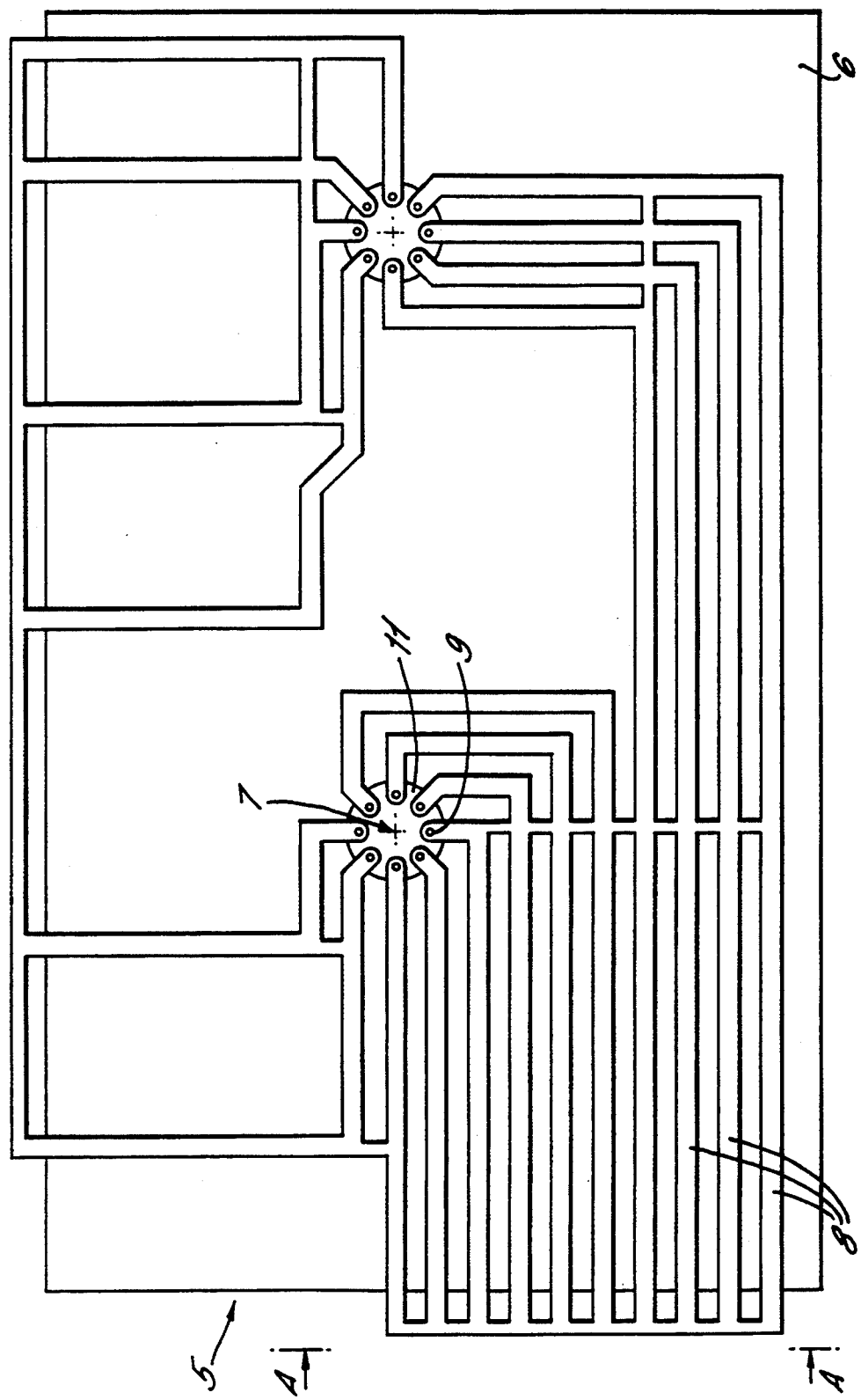
FIG. 2 is a plan view of the apparatus of the present invention.

FIG. 2 is a plan view of the apparatus which is suitable for use with an arrangement as depicted in FIG. 1. The apparatus comprises a rigid board construction generally indicated at 5. The board 5 is made up of two layers 6 of an electrically insulating material such as mica (or filamic—a mica imitation) between which are located rigid metal strips 8. The strips 8 form a "spider" network and are held in position by filler—adhesive, for example, HT Fibre Adhesive 1002 (Dender Alumet Limited) mixed with alumina powder to form a creamy paste which will harden around the strips 8. The strips 8 can simply be stamped out from a sheet of suitable conducting material. The strips 8 are arranged to converge at a predetermined point or points 7 on the board where there are corresponding holes 11 in the mica layers 6. Pins 9 are welded to the strips 8 where they converge and extend at substantially 90° to the plane of the mica layers 6 (see FIG. 3).

FIG. 3 is an enlarged view taken in direction A—A in FIG. 2. The pins 9 can be clearly seen and are held in position by a separator 10. Each strip 8 can thus be connected to a bank of cells and the pins 9 provide connection through the battery casing to the control circuitry and external charging means for the battery. The strips 8 when secured to the board 5 thus provide respective, mutually insulated conducting pathways.

The board construction 5 provides a temperature resistant arrangement protecting the connections within a battery from high temperatures. Furthermore, the pins 9 allow vibration of the battery with respect to the point of connection. Movement can take place both along the length of the pins and even a small sideways flexing movement can be provided for which is advantageous if the battery is used in a car which is experiencing vibrations.

I claim:

1. A battery of high temperature secondary cells in a battery casing having means enabling multiple electrical connections from outside said casing to respective cells or banks of cells within the casing, comprising:

a rigid board of electrical insulating material stable at the operating temperature of the battery; and a plurality of rigid metal elements secured to said board to provide respective, mutually insulated, conducting pathways, each of said plurality of rigid metal elements having one end connected to a respective cell or bank of cells and an opposite end, the opposite ends of the plurality of rigid metal elements converging to one location on the board at which connection through the casing is made.

2. A battery as claimed n claim 1 wherein the rigid board comprises two layers of mica between which are located the rigid metal elements in the form of strips.

3. A battery as claimed as claim 2 wherein the mica layers have holes therethrough at the points where the strips converge.

4. A battery as claimed in any preceding claim wherein the rigid metal elements are connected to pins at the points where they converge, the said pins leading through the battery casing to the external charging apparatus.

5. A battery as claimed in claim 4, wherein the pins extend substantially 90° to the plane of the rigid board.

6. A battery according to claim 1, wherein the opposite ends of the plurality of rigid metal elements converge to a number of locations on the board and the number of said locations is less than the number of rigid metal elements.

\* \* \* \* \*

UNITED STATES PATENT AND TRADEMARK OFFICE
CERTIFICATE OF CORRECTION

PATENT NO. : 5,447,808
DATED : September 5, 1995
INVENTOR(S) : John Molyneux

It is certified that error appears in the above-indentified patent and that said Letters Patent is hereby corrected as shown below:

Title page, after "Attorney, Agent, or Firm", second line, change "Garrrett" to --Garrett--.

Claim 2, column 4, line 5, change "n" to --in--.

Claim 3, column 4, line 8, change "as" (second occurrence) to --in--.

Signed and Sealed this

Fifth Day of December, 1995

Attest:

BRUCE LEHMAN

Attesting Officer   Commissioner of Patents and Trademarks